3,210,291
PROCESSES FOR BREAKING PETROLEUM EMULSIONS WITH DICARBOXY ACID ESTERS OF SULFATED OXYALKYLATED ALKYL PHENOL-FORMALDEHYDE RESINS
Willard H. Kirkpatrick, Sugar Land, and Virgil L. Seale, Houston, Tex., assignors to Nalco Chemical Company, Chicago, Ill., a corporation of Delaware
No Drawing. Original application June 8, 1959, Ser. No. 818,562, now Patent No. 3,108,087, dated Oct. 22, 1963. Divided and this application May 3, 1963, Ser. No. 277,701
10 Claims. (Cl. 252—335)

This application is a division of our copending application Serial No. 818,562, filed June 8, 1959, now Patent No. 3,108,087, issued October 22, 1963, which was a continuation-in-part of our application Serial No. 632,427, filed January 4, 1957, now abandoned.

This invention, in general, relates to new compositions of matter and their use in the treatment of emulsions of mineral oils and water, such as petroleum emulsions commonly encountered in the production, handling and refining of crude mineral oil.

Petroleum emulsions are, in general, of the water-in-oil type wherein oil acts as the continuous phase for dispersal of the finely-divided particles of naturally occurring waters or brines. These emulsions are often extremely stable and will not resolve into the oil and water components even on long standing. The emulsions obtained from producing wells and from the bottom of crude oil storage tanks are commonly referred to as "cut oil," "emulsified oil," "bottom settlings" and "B.S.". It is also to be understood that water-in-oil emulsions may occur artificially, resulting from any one or more of numerous operations encountered in various industries.

One type of process involves subjection of emulsions of the water-in-oil type to the action of a deemulsifying agent of the kind hereinafter described, thereby causing the emulsion to resolve and stratify into its component parts of oil and water or brine after emulsion has been allowed to stand in a relatively quiescent state.

One object of our invention is to provide novel and economical effective processes for resolving emulsions of the character referred to into their component parts of oil and water or brine.

Another object is to provide novel reagents which are surface-active in order to enable their use as deemulsifiers or for such uses where surface-active characteristics are necessary or desirable. Other objects will appear hereinafter.

In accordance with the invention, the crude oil deemulsifying agents are dicarboxy acid esters of sulfated oxyalkylated alkyl phenol-formaldehyde resins. The phenol-formaldehyde resins are the alkali-insoluble reaction products of formaldehyde with a difunctional monoalkyl phenol, the alkyl group having between 4–15 carbons, inclusive, preferably 5–15 carbons, and being in the ortho or para position. Dialkyl monofunctional phenols are not suitable for compositions of this invention, but amounts up to 25% dialkyl phenol in the monoalkyl phenol reactant may be tolerated. The weight ratio of the lower alkylene oxide, e.g., ethylene oxide or mixtures of ethylene oxide and 1,2-propylene oxide, to the phenol-formaldehyde condensation product will, for most applications, fall between about 1:2 and 15:1, respectively, preferably the range of 1:2 to 9:1.

Where both ethylene oxide and propylene oxide are used to oxyalkylate the phenol-formaldehyde condensation product, they may be reacted as a mixture of oxides to give heterogeneously mixed oxypropylene and oxyethylene groups in the oxyalkylene chains. Alternatively, one of the oxides may be reacted with the condensation product first, then the other. In this manner, the oxyalkylene chains are composed of polyoxypropylene groups attached to the phenolic nuclei of the condensation product and terminal poloxyethylene groups added upon the polyoxypropylene groups, or vice versa, wherein the polyoxyethylene groups are attached to the phenolic nuclei and the polyoxypropylene groups are in the terminal positions.

There is an advantage to having the terminal group of the oxyalkylene chains as an oxyethylene group because the latter has a primary hydroxyl group. A terminal oxypropylene group, on the other hand, has a secondary hydroxyl group, which is more difficult to sulfate or esterify than the primary hydroxyl group. Simultaneous reaction of a mixture of both ethylene and propylene oxide probably yields an oxyalkylated product having both types of terminal hydroxyl groups.

PHENOL-FORMALDEHYDE CONDENSATION

The phenol-formaldehyde condensation products are prepared by reacting formaldehyde or a substance which breaks down to formaldehyde under the reaction conditions, e.g., paraformaldehyde and trioxane, and a difunctional monoalkyl phenol by heating the reactants in the presence of a small amount of an acid catalyst such as sulfamic acid under substantially anhydrous conditions—excepting the water produced during the reaction. The aqueous distillate which begins to form is collected and removed from the reaction mixture. After several hours of heating at temperatures slightly above the boiling point of water, the mass becomes viscous and is permitted to cool to about 100 to 105° C. At this point a suitable hydrocarbon fraction is added, and heating is resumed. Further aqueous distillate begins to form and heating is continued for an additional number of hours until at least about one mol of aqueous distillate per mol of reactants has been secured. The product is permitted to cool to yield the phenol formaldehyde condensation product in a hydrocarbon solvent. The molecular weight of these intermediate condensation products cannot be ascertained with certainty, but we would approximate that the resins employed herein should contain about 4 to 15, preferably 4 to 10, phenolic nuclei per resin molecule. The solubility of the condensation product in hydrocarbon solvents such as $SO_2$ extract would indicate that the resins are linear type polymers, thus distinguishing them from the more common phenol-formaldehyde resins of the cross-linked type.

The phenol component of our phenol-formaldehyde resins is entirely or principally a difunctional phenol—one having only two of the three normally reactive ortho- and para-positions available for reaction with the formaldehyde. These phenols are mono-alkyl phenols with the alkyl group in the para or ortho position having up to about 15 carbons. Phenols suitable for our invention are difunctional, mono-alkyl phenols having straight chain or branch chain alkyl groups of 4–15 carbons, preferably 5–15 carbons. Examples of the phenolic component include such preferred phenols as p-n-butyl phenol, p-tertiary butyl phenol, p-amyl phenol, p-tertiary hexyl phenol, p-tertiary octyl (1,1,3,3-tetramethyl butyl-1) phenol, p-nonyl phenol, p-dodecyl phenol, a crude alkyl phenol containing at least about 90% p-nonyl phenol and up to 10% dinonyl phenol, and others including mixtures of ortho- and/or para-monoalkyl phenols and crude alkylate phenols containing at least 75% difunctional alkyl phenols with the remainder being primarily monofunctional phenols.

This aspect of the invention is illustrated in the following examples but is not limited thereto. The parts are by weight.

*Example A*

In a three-necked reaction flask provided with means of mechanical stirring and a return condenser system permitting the removal of any aqueous phase formed in the course of reaction, there is added 1500 parts of a crude alkylate phenol which comprises about 90% of an undistilled p-nonyl phenol containing approximately 10% of dinonylphenol, 225 parts paraformaldehyde and 3 parts sulfamic acid which is present as a catalyst in the reaction. The reaction mass is heated, and at 108° C. an aqueous distillate begins to form. After three hours heating at approximately 110° C. the mass becomes quite viscous and is permitted to cool to about 100° C. At this point 600 parts of $SO_2$ extract is added, and heating is resumed. Again at 110° C. further aqueous distillate begins to form, and heating is continued for an additional three hours, or until approximately 141 cc. of aqueous distillate has been secured at a maximum temperature of 212° C. The product is permitted to cool to yield the finished phenol-formaldehyde resin in the hydrocarbon solvent.

*Example B*

In a manner similar to Example A, 1000 parts of the crude alkylate phenol, 120 parts of paraformaldehyde and 2 parts sulfamic acid were heated 2 hours at 105–110° C. to permit reaction of the phenol and formaldehyde under conditions minimizing formaldehyde loss. At temperatures aboue 110° C. vigorous reaction sets in which must be controlled by cooling. After about 27 parts of aqueous distillate have been secured, the reaction comes under control and becomes exceedingly viscous. At this point the resin is cooled to 105° C., and 400 parts of $SO_2$ extract is added. Heating is continued for an additional three hours, or until a total of about 75 parts of aqueous distillate have been removed at maximum temperature of 212° C. to yield the finished phenol-formaldehyde resin in the hydrocarbon solvent.

*Example C*

In a manner similar to Examples A and B, 1000 parts of the crude alkylate phenol, 90 parts paraformaldehyde and 2 parts sulfamic acid are carefully reacted at temperatures of 100–110° C. When the reaction mass becomes quite viscous, the reaction is permitted to cool, and 400 parts of $SO_2$ extract are added. Heating is resumed for an additional hour, or until a total of 55 parts of aqueous distillate have been secured at maximum temperature of 213° C. to yield the finished phenol formaldehyde resin in the hydrocarbon solvent.

*Example D*

To a vessel having a stirrer and a return condenser system permitting the removal of the aqueous phase of the distillate is added 1400 parts of p-tertiary butyl phenol, 310 parts of paraformaldehyde and 5 parts of sulfamic acid as catalyst. The mass is heated, and at about 105–110° C. an aqueous distillate begins to form. After heating for three hours at 105–110° C., the mass becomes viscous and is permitted to cool to 95–100° C. About 500 parts of a suitable hydrocarbon fraction is added and heating is resumed. At 105–110° C. further distillate begins to form and heating is continued for an additional three hours until approximately 140 cc. of aqueous distillate is obtained. The product is cooled to yield the phenol-formaldehyde resin solution in the hydrocarbon vehicle.

*Example E*

Following the technique of Example D, an equivalent amount of p-teriary hexyl phenol is substituted for the p-tertiary butyl phenol of Example D.

In the preceding examples, sulfamic acid has been used as the acid catalyst to assist in the condensation reaction. Other suitable equivalent acids which may be used in place of sulfamic acid are mineral acids such as sulfuric acid, hydrochloric acid, phosphoric acid, etc.

As stated heretofore, intermediate phenol-formaldehyde resin should contain a minimum of about 4 phenolic nuclei and should not exceed about 15 phenolic nuclei. It is extremely difficult, if not impossible, to accurately determine the molecular weight of the intermediate resin products. However, it is believed that the resin of Example A contains about 10 phenolic nuclei per resin molecule, Example B, about 7 phenolic nuclei, and Example C, about 4 phenolic nuclei per resin molecule.

*Oxyalkylation of the condensation products*

Having prepared the intermediate phenol-formaldehyde products, the next step is the oxyalkylation with cyclic oxides having 2–3 carbons of the condensation products—oxyalkylation occurring at the —OH group of the phenol to provide oxyalkylene group on the phenolic nuclei. This is achieved by mixing the intermediate phenol-formaldehyde condensation product in a hydrocarbon solvent with a small amount of a suitable catalyst in an autoclave. The condensation product is heated above 100° C., and ethylene oxide or a mixture of ethylene oxide and 1,2-propylene oxide, either as a mixture or by sequential addition of first either the propylene oxide or the ethylene oxide and then the other oxide, is charged into the autoclave until the pressure is in the vicinity of 75–100 p.s.i.

The reaction mixture is gradually heated until an exothermic reaction begins. The external heating is then removed, and alkylene oxide is added at such a rate that the temperature is maintained between about 150–160° C. at a pressure range of 80 to 100 p.s.i. After all of the alkylene oxide has been added, the temperature is maintained for an additional 10 to 20 minutes to assure substantially complete reaction of the alkylene oxide. The resulting product is the alkylene oxide adduct of an alkyl phenol formaldehyde condensation product, in which the weight ratio of the oxide to the condensation product is between about 2:3 and 15:1, respectively, preferably 2:3 to 9:1. The molecular weight of the oxyalkylated phenol formaldehyde condensation products of this invention range from as low as about 1100 to as high as about 50,000. In the products containing both oxyethylene and oxypropylene groups, the ratio of the two will ordinarily vary from the lower limit of no oxypropylene groups (totally oxyethylated) to an oxypropylene to oxyethylene weight ratio not exceeding about 25:1.

Some preferred embodiments of the oxyalkylated, alkyl phenol formaldehyde condensation products and methods of their preparation are illustrated in the following examples wherein all parts are by weight unless otherwise stated, but the invention is not limited thereto.

*Example F*

In an autoclave having a two-liter capacity equipped with a means of external electric heating, internal cooling coils and mechanical agitation, there is charged 950 parts of the resin solution of Example A, and 1.5 parts of sodium hydroxide. Into a transfer bomb there is introduced 575 parts ethylene oxide. The resin is heated to 135° C., and the ethylene oxide is charged into the reactor until reactor pressure is 80 p.s.i. The reaction mixture is gradually heated until an exothermic reaction begins to take place. The external heating is then removed and ethylene oxide is then added at such a rate that the temperature is maintained between 150–160° C. with a pressure range of 80 to 100 p.s.i. After approximately two hours all of the oxide has been added to the autoclave, and the temperature is maintained for an additional 15 minutes to make certain that the unreacted oxide is reduced to a minimum. The resulting product is the ethylene oxide adduct of a phenol-formaldehyde resin, in which the weight ratio of oxide to resin by weight is 2 to 3. The oxyalkylated phenol formaldehyde condensation product had a hydroxyl equivalent weight of about 620 and contained about ten oxyalkylene chains per resin molecule.

Example G

In a manner similar to Example F, the ethylene oxide adduct of the resin of Example B was prepared in which the ratio of ethylene oxide to resin was 1½ to 1 by weight. The oxyalkylated phenol-formaldehyde condensation product had a hydroxyl equivalent weight of about 840 and contained about four oxyalkylene chains per resin molecule.

Example H

In the same facilities as used in Example F, there is charged 172 parts of the resin solution of Example A and 1 part of sodium hydroxide. Into a transfer bomb there is introduced 250 parts by weight of ethylene oxide and 250 parts of propylene oxide. The intermediate is heated to 135° C., and the mixed oxides are charged into the reactor until the reactor pressure is 80 p.s.i. The reaction conditions from here on are identical with those employed in Example F. The resulting product is the mixed oxide adduct of a phenol-formaldehyde resin in which the ratio of oxide to resin by weight is approximately 4 to 1. The oxyalkylated phenol formaldehyde condensation product had a hydroxyl equivalent weight of about 1400 and contained about ten oxyalkylene chains per resin molecule.

Example J

In a manner similar to Example H, using a 1 to 1 by weight ratio of ethylene oxide and propylene oxide, a mixed oxide adduct of the resin of Example C was prepared in which the ratio of oxide to resin was 6 to 1. The oxyalkylated phenol-formaldehyde condensation product had a hydroxyl equivalent weight of about 1400 and contained about four oxyalkylene chains per resin molecule.

Example K

In a manner similar to Example H using a 1 to 3 by weight ratio of ethylene oxide to propylene oxide, a mixed oxide adduct of the resin of Example C was prepared in which the ratio of oxide to resin was 6 to 1. The oxyalkylated phenol-formaldehyde condensation product had a hydroxyl equivalent weight of about 1500 and contained about four oxyalkylene chains per resin molecule.

Example L

In a manner similar to Example H using a 1 to 3 by weight ratio of ethylene oxide to propylene oxide, a mixed oxide adduct of the resin of Example B was prepared in which the ratio of oxide to resin was 2 to 1.

Example M

In a manner similar to Example H using a 3 to 1 by weight ratio of ethylene oxide to propylene oxide, a mixed oxide adduct of the resin of Example A was prepared in which the ratio of oxide to resin was 1 to 1. The oxyalkylated phenol-formaldehyde condensation product had a hydroxyl equivalent weight of about 700 and contained ten oxyalkylene chains per resin molecule.

Example N

In a manner similar to Example F there is prepared a propylene oxide adduct of the resin of Example A in which the ratio of propylene oxide to resin by weight is 1 to 1. The oxypropylated phenol formaldehyde resin was then reacted further with ethylene oxide until the finished product contained 10% by weight of ethylene oxide. The oxyalkylated phenol-formaldehyde condensation product had a hydroxyl equivalent weight of about 750 and contained about ten oxyalkylene chains per resin molecule.

Example O

In a manner similar to Example N a propylene oxide adduct of the resin of Example C was prepared in which the ratio of propylene oxide to resin was 6 to 1 by weight. Ethylene oxide was then added to this oxypropylated phenol-formaldehyde resin until the finished product contained 20% by weight of ethylene oxide. The oxyalkylated phenol formaldehyde condensation product had a hydroxyl equivalent weight of about 1200 and contained about four oxyalkylene chains per resin molecule.

Example P

In a manner similar to Example N a propylene oxide adduct of the resin of Example A was prepared in which the ratio of propylene oxide to resin was 9 to 1 by weight. This oxypropylated phenol formaldehyde resin was then further reacted with ethylene oxide until the finished material contained 5% by weight of ethylene oxide. The oxyalkylated phenol-formaldehyde condensation product had a hydroxyl equivalent weight of about 1400 and contained about ten oxyalkylene chains per resin molecule.

Example Q

In a manner similar to Example N a propylene oxide adduct of the resin of Example C was prepared in which the ratio of propylene oxide to resin was 2 to 1 by weight. This oxypropylated phenol-formaldehyde resin was then further reacted with ethylene oxide until the finished material contained 30% by weight of ethylene oxide. The oxyalkylated phenol-formaldehyde condensation product has a hydroxyl equivalent weight of about 1200 and contained about four oxyalkylene chains per resin molecule.

Example R

In a manner similar to Example H, the mixed propylene oxide and ethylene oxide adduct (weight ratio 6:1, respectively) of the resin of Example D is prepared in which the weight ratio of oxide to condensation product is 4 to 1.

Example S

In a manner similar to Example F, the mixed propylene oxide and ethylene oxide adduct (weight ratio 3:1, respectively) of the condensation product of Example E is prepared in which the weight ratio of oxide to condensation product is 2 to 1.

SULFATION AND ESTERIFICATION OF THE OXYALKYLATED CONDENSATION PRODUCTS

The next and final step in the preparation of the compositions of our inventions is esterification with dicarboxy acids and sulfation of the oxyalkylated alkyl phenol-formaldehyde condensation products. In some instances, the sulfation and dicarboxy acid esterification steps can be carried out simultaneously, and in other instances it it preferred, and sometimes even essential, that the dicarboxy acid esterification step be carried out prior to the sulfation step. When using a dicarboxy acid, the esterification reaction should precede the sulfation reaction with, for example, sulfamic acid. When a dicarboxy acid anhydride is employed for esterification, the sulfation and esterification reactions may be carried out simultaneously, if desired.

The dicarboxy acid esterification step is achieved heating the oxylated resin and dicarboxy acid or anhydride thereof in a suitable hydrocarbon solvent to a temperature sufficient to produce esterification, at least above the boiling point of water. The aqueous distillate is collected and removed from the reaction vessel. The same condition are applicable when sulfation and esterification are carried out simultaneously or when sulfation precedes esterification. Care must be taken, however, that the temperature he held below that at which the reactants are decomposed or otherwise detrimentally affected by the sulfating composition. In some instances, the reaction can be carried out advantageously under vacuum where the temperature must be kept below 100° C. with the particular sulfating agent used. However, we prefer to use sulfamic acid as the sulfating agent in simultaneous sulfation and esterification because the reactants may be heated substantially above 100° C. without detrimental effect on the reactants by the sulfamic acid. In general, the dicarboxy acid esterification proceeds more rapidly and efficiently at temperatures above 100° C. The sulfation reaction is described in more detail below. The esterification reaction is stopped when sufficient aqueous distillate has been collected which is equivalent to esterification of one carboxyl group of the dicarboxy acid or anhydride, or somewhat prior thereto. The reaction should not proceed substantially beyond this point because the final dicarboxy acid esters of sulfated oxyalkylated alkyl phenol formaldehyde resins should have essentially one free carboxyl group per dicarboxy acid radical. The degree of esterification with the dicarboxy acid may range from compositions in which only one hydroxyl group per sulfated oxyalkylated phenol formaldehyde molecule is esterfied to total esterification of the unsulfated hydroxyl groups of the oxyalkylated resin.

The degree of sulfation may range from compositions in which only one hydroxyl group per esterified oxyalkylated phenol-formaldehyde resin molecule is sulfated to total sulfation of the unesterfied hydroxyl groups of the oxyalkylated resin. The preferred sulfating reagent is sulfamic acid because of the ease and convenience in handling in plant operations. The sulfo groups, however, can be introduced by other means such as sulfuric acid, sulfur trioxide, etc. With the use of these latter reagents it is essential that the temperature conditions of reaction be lower and be carefully controlled so that the sulfation reaction proceeds without decomposition of the oxyalklyated phenol-formaldehyde resin. Other than the careful control of temperature conditions and sulfation at lower temperatures, the reaction conditions employed for the preparation of the sulfo derivatives with the last-mentioned sulfating agents are substantially identical to those for sulfation with sulfamic acid. The sulfation is accomplished by heating and stirring a mixture of the oxyalkylated phenol-formaldehyde resin and the sulfating reagent. The mixture is heated in the vicinity of about 120–150° C. in the case of sulfamic acid and held at that point for approximately two hours under agitation to complete the sulfation reaction. The sulfated product so prepared is then cooled below about 100° C., at which point a suitable hydrocarbon extract is added to yield a solution of the finished product. It has been observed that increasing the number of sulfo groups per molecule results in substantially increased viscosity of the sulfated product.

The dicarboxy acids are aliphatic, cycloaliphatic or aromatic polycarboxy acids. In some instances, we prefer dicarboxy acids having 2–10 carbons and in other instances acids of higher molecular weight, having at least 36 carbons, such dimerized abietic acid, dimerized linoleic acid, dimerized linoleic acid, etc., are employed. Polycarboxy acids or anhydrides thereof which may be used in the esters of our invention include oxalic, maleic, malonic, succinic, diglycolic, adipic, azelic, sebacic, fumaric, tartronic, malic, camphoric, tartaric, phthalic, and terephthalic acids or anhydrides, VR–1 polymeric acid, dimerized abietic acid, dimerized linoleic acid or dimerized linoleic acid, amoung others, including the following dimerized drying oil acids.

Every dimer acid is essentially dilinoleic acid and is a polymer made by polymerizing an unsaturated fatty acid containing at least two nonconjugated double bonds. Such acids may also be described as polymer drying oil acids. The term "drying oil acid" is used herein to mean an unsaturated fatty acid containing at least two double bonds and at last six carbon atoms. The polymer acids employed for the purpose of the invention preferably consist predominantly of dimer acids but may contain trimers and higher polymers. The preferred polymer acids are those containing 12 to 40 carbon atoms and especially the polymers of the drying oil acids of the linoleic acid series, including, for example, the polymers of sorbic acid, geranic acid, palmitolic acid, linoleic acid and humoceric acid. It will be understood that these polymers may include cogeneric mixtures of polycarboxy acids.

A number of these polymers acids are available as by-product materials. Thus, one source of the polymeric acids suitable for the purposes of this invention is the still residue if the dry distillation of castor oil in the presence of sodium hydroxide. VR–1 acid is an acid of this type.

VR–1 acid is a mixture of polybasic acids, with an average molecular weight of about 1,000. It has an average of slightly more than two carboxylic acid groups per molecule. It is a by-product acid, and is a dark amber, rather viscous liquid. A typical sample of VR-1 acid gave the following analysis:

Acid number _____ 150
Iodine number _____ 36
Saponification number _____ 172
Unsaponifiable matter _____percent____ 3.7, 3.5
Moisture content _____do____ 0.86

The dicarboxy acid esters of the sulfated oxyalkylated resins may be used in the acid form or any suitable form wherein the ionizable hydrogen of the sulfate group is replaced by a metal or other suitable cation. In many instances, it is desirable that the compositions be in the form of salts of alkali metals or the ammonium salt. These salts may be obtained by reacting the acidic product with a metallic hydroxide, ammonia, or an organic base, or an alkaline salt of one of these. Suitable bases and salts include ammonium, sodium and potassium hydroxides and carbonates, as well as bicarbonates; aqueous ammonia; and amines such as lower alkyl amines, lower alkanol amines, and simple aryl amines. Sulfamic acid as the sulfating reagent yields the ammonium salt.

The compositions of our invention are insoluble in water. For purposes herein, the sulfated and esterified oxyalkylated phenol-formaldehyde condenstation products of the character herein described are considered to be water insoluble when, at equilibrium with distilled pure water at 70° F., not more than 2 parts by weight dissolve per 100 parts of water. These products are distinguished from water-soluble, detergent-type resins of somewhat similar composition.

To provide the desired water insolubility, the hydrophilic-hydrophobic balance of our compositions must be weighted on the hydrophobic side. Oxyethylene groups are considerably more hydrophilic than oxypropylene groups. Noting that the alkyl phenol-formaldehyde resins, upon which our compositions are built, are per se water insoluble, there is a definite limit to the amount of oxyethylation thereof in order to avoid reaching a state of water insolubility of our ultimate compositions through excessive oxyethylation.

The polycarboxy acid component also has a bearing on the hydrophilic-hydrophobic balance. In general, the lower the molecular weight of the polycarboxy acid, the greater is hydrophilic nature. Polycarboxy acids having 36 or more carbons, such as dimerized linoleic or linolenic acids (which may contain minor amounts of higher polymers) dimerizer abietic acid, or VR-1 polymer acid, are much more hydrophobic than polycarboxy acids having 2-10 carbons.

Accordingly, our compositions must have either sufficient oxypropylene groups, or a higher molecular weight polycarboxy acid, or both, to make the ultimate product water-insoluble within the meaning given supra.

Where ethylene oxide is the sole oxyalkylating agent, the weight ratio of ethylene oxide to alkyl phenol-formaldehyde condensation product will not exceed about 2:1 nor be less than about 2:3, respectively, and the polycarboxy acid will be a polycarboxy acid having at least 36 carbons, such as one of those described heretofore. Where the phenol-formaldehyde condensation products are oxyalkylated by a heterogeneous mixture of 1,2-propylene oxide and ethylene oxide, or by the sequential addition of one oxide and then the other, the weight ratio of the oxides may vary from all ethylene oxide up to a ratio of propylene oxide to ethylene oxide of 25:1 when the polycarboxy acid used to esterify the oxyalkylene hydroxyl groups contains at least about 36 carbons. When the polycarboxy acid contains 2-10 carbons, the oxyalkylene groups should have a weight ratio of oxypropylene groups to oxyalkylene groups which is not less than about 1:1 nor more than about 25:1, respectively.

The following examples will further illustrate the nature of the compositions of this invention in preferred embodiments thereof, but the invention is not limited to these examples.

*Example I*

In a three-necked reaction flask provided with means of mechanical stirring and return condenser system permitting the removal of any aqueous phase formed in the reaction, there is added 400 parts by weight of the oxyalkylated resin of Example Q, 20 parts by weight of diglycolic acid and 50 parts by weight of a suitable hydrocarbon fraction such as $SO_2$ extract. The reaction mass is heated, and at 200° C. an aqueous distillate begins to form. After approximately 45 minutes of heating and a maximum temperature of 265° C., a total aqueous distillate has been secured, which is equivalent to esterification of one carboxyl group of the diglycolic acid. The reaction mass is cooled to 140° C. and 4 parts by weight of sulfamic acid are added and heated further for 1 hour at 130-140° C. To the cooled mass is added 225 parts by weight of $SO_2$ extract to yield a solution of the finished dibasic acid ester of a sulfated oxyalkylated phenol-formaldehyde resin.

*Example II*

In a manner similar to Example I, 400 parts of the oxyalkylated resin of Example O, 20 parts diglycolic acid and 50 parts of $SO_2$ extract are heated until 4.2 parts of an aqueous distillate have been secured at a maximum temperature of 260° C. The product is cooled to 135° C., 4 parts of sulfamic acid are added, and heating continued for 1 additional hour. The product is permitted to cool, and 285 parts of $SO_2$ extract and 50 parts of methanol are added to yield the finished product.

*Example III*

In a manner similar to Example I, 400 parts of the oxyalkylated resin of Example P, 20 parts of diglycolic acid and 50 parts of $SO_2$ extract are heated to secure approximately 3 parts of an aqueous distillate at a maximum temperature of 246° C. After cooling to 135° C., 4 parts of sulfamic acid are added, and the temperature maintained at that point for 1 hour. After cooling, 275 parts of $SO_2$ extract and 50 parts of methanol are added to yield the finished product.

*Example IV*

In a manner similar to Example I, 100 parts of the oxyalkylated resin of Example F, 12 parts of sulfamic acid, 12.5 parts of dilinoleic acid and 32 parts of $SO_2$ extract were heated at 130-140° C. for 4 hours to yield the sulfated ester. After cooling, 32 parts of isopropanol were added to yield the finished product.

*Example V*

In a manner similar to Example I, 400 parts of the oxyalkylated resin of Example H and 8 parts of sulfamic acid were heated 2 hours at 135-145° C. At this point, 40 parts of maleic anhydride were added and the reaction mixture further heated for 4 hours to 120-130° C.

*Example VI*

In a manner similar to Example I, 400 parts of the oxyalkylated resin of Example J, and 4 parts of sulfamic acid were heated for 1 hour at 130-135° C. At this point, 40 parts maleic anhydride were added and the temperature continued for 3 hours at 120-125° C. After cooling, 400 parts of $SO_2$ extract were added to yield the finished product.

*Example VII*

In a manner similar to Example I, 100 parts of the oxyalkylated resin of Example N, 12 parts sulfamic acid, 6 parts phthalic anhydride and 32 parts of $SO_2$ extract were heated to 130-140° C. for 4 hours. After cooling, 32 parts of isopropanol were added to yield the finished material.

*Example VIII*

In a manner similar to Example I, 100 parts of the oxyalkylated resin of Example N, 10 parts of sulfamic acid, 18 parts of dimerized abietic acid, and 40 parts of $SO_2$ extract are heated to about 150° C. for 6 hours. After cooling, 150 parts of $SO_2$ extract are added.

*Example IX*

In a manner similar to Example I, 200 parts of the oxyalkylated resin of Example G, 18 parts of sulfamic acid, 50 parts of Rohm & Haas VR-1 polymeric acid having an average molecular weight of about 1000 and an average of about two carboxy groups per molecule, and 75 parts of $SO_2$ extract are heated to about 160° C. for 6 hours. After cooling, 250 parts of $SO_2$ extract are blended with the reaction product.

Among the suitable hydrocarbon vehicles which can be employed as reaction solvents is sulfur dioxide extract. This material is a by-product from the Edeleanu process of refining petroleum in which the undesirable fractions are removed by extraction with liquid sulfur dioxide. After removal of the sulfur dioxide a mixture of hydrocarbons, substantially aromatic in character, remains and is designated in the trade as sulfur dioxide extract or $SO_2$ extract. Examples of other suitable hydrocarbon vehicles are toluene, xylene, gas oil, diesel fuel, bunker fuel and coal tar solvents. The above cited examples of solvents are adaptable to azeotropic distillation as would also be any other solvent which is immiscible with water, miscible with the reacting mass and has a boiling point or boiling range in excess of the boiling point of water.

DEEMULSIFICATION

The compositions of this invention are surface-active and are particularly suitable for the deemulsification of crude oil emulsions. Deemulsification is achieved by mixing the deemulsifying agents of this invention, at a ratio in the approximate range of one part of the deemulsifying agent to 2,000-50,000 parts of the emulsion, and thereafter allowing the emulsion to remain in a relatively quiescent state during which separation of the oil and water occurs. The deemulsifying agents of this invention may be used in conjunction with other deemulsifying agents from classes such as the petroleum sulfonate type, of which naphthalene sulfonic acid is an example, the modified fatty acid type, the amine modified oxyalkylated phenol-formaldehyde type, and others.

The effectiveness of the compositions of this invention as deemulsifying agents is illustrated in the following tests and data.

BOTTLE TESTING OF CRUDE OIL EMULSIONS

The bottle testing of crude oil emulsions is conducted according to the following procedure: Fresh samples of the emulsion-breaking chemicals in organic solvent solution are prepared in 10% solutions. These solutions are made by accurately diluting 10 milliliters of the emulsion-breaking chemicals in 90 milliliters of a mixture of equal parts of anhydrous isopropyl alcohol and an aromatic hydrocarbon such as xylene. The mixture is agitated well until the emulsion-breaking chemical is completely dissolved.

The equipment for running the crude oil emulsion-breaking test, in addition to the foregoing 10% solutions, includes a set of six ounce graduated prescription bottles, a funnel, a graduated 0.2 milliliter pipette, a thief pipette, a centrifuge, centrifuge tubes and a thermometer. The graduated prescription bottles are filled to the 100 milliliter mark with the crude oil emulsion to be tested, preferably a sample which has been recently collected. If there is any free water in the crude oil emulsion sample collected, it is bled off before the bottles are filled. Each bottle is inverted several times with the thumb over the opening of each bottle so that the bottle will be coated with an emulsion film.

By means of the 0.2 milliliter pipette, the prescribed volume of the 10% solution of the emulsion-breaking chemical is added to the emulsion in the bottles. The bottles are then capped and given manual agitation for a predetermined number of counts. The number of counts are determined by a survey of the agitation which can be secured in the system in which the crude oil emulsion is being used. If the emulsion requires heat for treatment, the bottles are placed in hot water bath, the length of time and temperature determined by the particular plant equipment and practice in which the particular emulsion is employed. If the plant provides for hot agitation of the emulsion the bottles may be given a corresponding amount of manual hot agitation.

The bottles are then removed from the hot water bath and the water drop, presence of the bottom settlings (B.S.) layer and color and general appearance of the oil are noted.

A thief grind-out is taken on all bottles which appear to be promising. A thief grind-out is made by preparing centrifuge tubes filled with gasoline to the 50% mark. The thief pipette is set to the proper length by adjusting the rubber stopper so that the bottom of the pipette is about ¼ inch above the oil-water level of the bottle with maximum water drop. This same setting is used for all subsequent thiefings on remaining bottles. The thiefed oil from each bottle is added to the centrifuge tube to the 100% mark, and the tube is shaken. The samples are then centrifuged for three minutes.

With certain paraffin base oils a portion of the paraffin is thrown down with the B.S. If the centrifuge tubes are heated to 150° F., the paraffin will melt and be dissolved in the gasoline-oil mixture and usually will not be thrown down again with the B.S. upon centrifuging while hot. However, occasionally the paraffin will re-congeal as the tube cools during centrifuging. If this occurs, the tube is removed from the centrifuge and heated to 150° F. without shaking or disturbing the settled B.S. layer. The heated sample is then centrifuged for 15 seconds. This should give a true B.S. reading free of paraffin.

An excess chemical grind-out is then run on each centrifuge by adding several drops of a 20% solution in white gasoline or other solvent of a chemical which causes complete separation of the water and oil. With some sensitive emulsions the chemical will cause reemulsification. In these instances it is necessary to rethief and add a lesser amount. Each tube is vigorously shaken to make sure that the packed B.S. layer is broken up and the tubes heated to 150° F. in the case of troublesome paraffin base crude oil. The samples are then centrifuged for three minutes.

During the test the speed of the water drop is observed carefully after the emulsion-breaking chemical is added to the prescription bottles. The observation of the color and brilliance of the oil in transmitted light is very important. In general, the brilliance and depth of color increases with a decrease in B.S. & W. (bottom settlings and water) content. The observations of color are made in the oil in the prescription bottles before and after heat treatment. In the ideal treatment of crude oil emulsions the oil-water line could be a sharp, clean line without any web or sludge present. Presence of a considerable amount of sludge or web is undesirable because this foreign material will eventually go to stock in the treating plant and be reported as B.S. Traces of web or sludge, however, will disappear or be removed in the normal treating plant.

In almost all instances the thief grind-out and excess chemical grind-out readings indicate the formula that has most nearly produced crude oil free from B.S. and water. The most efficient emulsion-breaking chemical is determined by the foregoing test procedure by the overall consideration of the following factors: relative speed of the breaking of the emulsion which is usually indicated by speed of water drop, color and brilliance of the oil layer, the relative absence of web or sludge at oil-water line and the ability to most nearly produce treated oil that is free from B.S. and water.

By way of illustrating the effectiveness of the emulsion-breaking chemicals contemplated by this invention, the composition of Example I was tested according to the foregoing bottle testing procedure on samples of 22 gravity crude oil obtained from Smackover Field, Arkansas. The crude oil emulsion contained about 39% water. The commercial treating chemical being used on the lease and the treating chemical of Example I were both tested for comparative purposes. These treating chemicals were added at a ratio of 0.10 part of a 10% solution, as described in the foregoing procedure, to 100 parts of the emulsion fluid. The samples were given 200 shakes cold. The observations made during the tests were recorded and are summarized in the following table.

TABLE I

| Treating Chemical | Water Drop | | | | Thief Grind-Out | | Excess Grind-Out | |
|---|---|---|---|---|---|---|---|---|
| | 1 hr. | 3¾ hr. | 5 hr. | 22 hr. | B.S. | Water | B.S. | Water |
| Commercial Chemical | 10 | 20 | 26 | 32 | 0 | 9.0 | 0 | 9.5 |
| Example I | 9 | 27 | 29 | 35 | Trace | 6.0 | 0 | 6.0 |

Similar tests were made on a crude oil emulsion containing about 56% water of a 24 gravity crude oil from a lease in Esperson Dome Field, Texas. The treating chemicals tested included the commercial deemulsifying agent being used on the lease in addition to the treating composition of Example II at a ratio of 0.06 part of a 10% solution of the treating chemical to 100 parts of the emulsion fluid. The samples were given 150 cold shakes and 50 hot shakes, the hot temperature being 120° F. A summary of the observations made during the test appears in the following table.

TABLE II

| Treating Chemical | Water-Drop | | Thief Grind-Out | | Excess Grind-Out | |
|---|---|---|---|---|---|---|
| | 30 min. | 80 min. | B.S. | Water | B.S. | Water |
| Commercial Chemical | 20 | 49 | 0 | 8.5 | 0 | 9.2 |
| Example II | 49 | 53 | 0 | 3.0 | 0 | 3.2 |

The invention is hereby claimed as follows:

1. In a process for breaking petroleum oil emulsions of the water-in-oil type, subjecting said emulsion to the action of a water-insoluble composition comprising a substantially linear, hydrocarbon solvent soluble, alkyl phenol-formaldehyde condensation product having about 4–15 phenolic nuclei, wherein the alkyl phenol is at least 75% mono-alkyl phenol and the alkyl group has 4–15 carbons, said condensation product being substituted on the phenolic nuclei by polyoxyalkylene radicals wherein the alkylene groups contain 2–3 carbons, at least one of the polyoxyalkylene groups per molecule of condensation product being sulfated, the weight ratio of oxyalkylene groups to said condensation product being in the range of 1:2 to 15:1, respectively, at least one hydroxyl group of the polyoxyalkylene groups per molecule of condensation product being esterified with a dicarboxy acid and wherein substantially only one of the two carboxy groups of the dicarboxy acid is esterified.

2. The process of claim 1 wherein the dicarboxy acid is one having at least 36 carbons.

3. In a process for breaking petroleum oil emulsions of the water-in-oil type, subjecting said emulsion to the action of a water-insoluble composition comprising a substantially linear, hydrocarbon solvent soluble, alkyl phenol-formaldehyde condensation product having about 4–15 phenolic nuclei, wherein the alkyl phenol is at least 75% mono-alkyl phenol and the alkyl group has 4–15 carbons, said condensation product being substituted on the phenolic nuclei by polyoxyalkylene radicals wherein the alkylene groups contain 2–3 carbons, at least one of the polyoxyalkylene groups per molecule of condensation product being sulfated, the weight ratio of oxyalkylene groups to said condensation product being in the range of 1:2 to 9:1, respectively, at least one hydroxyl group of the polyoxyalkylene groups per molecule of condensation product being esterified with a dicarboxy acid and wherein substantially only one of the two carboxy groups of the dicarboxy acid is esterified.

4. The process of claim 3 wherein the dicarboxy acid is one having at least 36 carbons.

5. In a process for breaking petroleum oil emulsions of the water-in-oil type, subjecting said emulsion to the action of a water-insoluble composition comprising a substantially linear, hydrocarbon solvent soluble, alkyl phenol-formaldehyde condensation product having about 4–15 phenolic nuclei, wherein the alkyl phenol is at least 75% mono-alkyl phenol and the alkyl group has 4–15 carbons, said condensation product being substituted on the phenolic nuclei by polyoxyethylene radicals at a weight ratio of polyoxyethylene radicals to condensation product in the range of 1:2 to 2:1, respectively, at least one of the polyoxyethylene radicals per molecule of condensation product being sulfated, at least one hydroxyl group of the polyoxyethylene radicals per molecule of condensation product being esterified with a dicarboxy acid and wherein substantially only one of the two carboxy groups of the dicarboxy acid is esterified.

6. In a process for breaking petroleum oil emulsions of the water-in-oil type, subjecting said emulsion to the action of a water-insoluble composition comprising a substantially linear, hydrocarbon solvent soluble, alkyl phenol-formaldehyde condensation product having about 4–15 phenolic nulcei wherein the alkyl phenol is at least 75% mono-alkyl phenol and the alkyl group has 4–15 carbons, said condensation product being substituted on the phenolic nuclei by polyoxyalkylene radicals consisting of a heterogeneous mixture of oxyethylene and oxypropylene groups at a weight ratio of polyoxyalkylene groups to condensation product in the range of 1:2 to 15:1, respectively, at least one of the polyoxyalkylene groups per molecule of condensation product being sulfated, at least one hydroxyl group of the polyoxyalkylene groups per molecule of condensation product being esterified with a dicarboxy acid and wherein substantially only one of the two carboxy groups of the dicarboxy acid is esterified.

7. In a process for breaking petroleum oil emulsions of the water-in-oil type, subjecting said emulsion to the action of a water-insoluble composition comprising a substantially linear, hydrocarbon solvent soluble, alkyl phenol-formaldehyde condensation product having about 4–15 phenolic nuclei, wherein the alkyl phenol is at least 75% mono-alkyl phenol and the alkyl group has 4–15 carbons, said condensation product being substituted on the phenolic nuclei by polyoxyalkylene radicals at a weight ratio of polyoxyalkylene groups to condensation product in the range of 1:2 to 15:1, said polyoxyalkylene radicals consisting of polyoxypropylene groups and polyoxyethylene groups substituted on the phenolic nuclei in sequential order, at least one of the polyoxyalkylene groups per molecule of condensation product being sulfated, at least one hydroxyl group of the polyoxyalkylene groups per molecule of condensation product being esterified with a dicarboxy acid and wherein substantially only one of the two carboxy groups of the dicarboxy acid is esterified.

8. In a process for breaking petroleum oil emulsions of the water-in-oil type, subjecting said emulsion to the action of a water-insoluble composition comprising a substantially linear, hydrocarbon solvent soluble, alkyl phenol-formaldehyde condensation product having about 4–15 phenolic nuclei, wherein the alkyl phenol is at least 75% mono-alkyl phenol and the alkyl group has 4–15 carbons, said condensation product being substituted on the phenolic nuclei by polyoxyalkylene radicals wherein the alkylene groups contains 2–3 carbons, at least one of the polyoxyalkylene groups per molecule of condensation product being sulfated with sulfamic acid to form the ammonium salt of the sulfated polyoxyalkylated phenol-formaldehyde condensation product, the weight ratio of oxyalkylene groups to said condensation product being in the range of 1:2 to 15:1, respectively, at least one hydroxyl group of the polyoxyalkylene groups per molecule of condensation product being esterified with a dicarboxy acid and wherein substantially only one of the two carboxy groups of the dicarboxy acid is esterified.

9. In a process for breaking petroleum oil emulsions of the water-in-oil type, subjecting said emulsion to the action of a water-insoluble composition comprising a substantially linear, hydrocarbon solvent soluble, alkyl phenol-formaldehyde condensation product having about 4–15 phenolic nuclei, wherein the alkyl phenol is at least 75% mono-alkyl phenol and the alkyl group has 4–15 carbons, said condensation product being substituted on the phenolic nuclei by polyoxyalkylene radicals wherein the alkylene groups contain 2–3 carbons, at least one of the polyoxyalkylene groups per molecule of condensation product being sulfated with sulfamic acid to form the ammonium salt of the sulfated polyoxyalkylated phenol-formaldehyde condensation product, the weight ratio of oxyalkylene groups to said condensation product being in the range of 1:2 to 15:1, respectively, at least one hydroxyl group of the polyoxyalkylene radicals per molecule of condensation product being esterified with diglycolic acid and wherein substantially only one of the two carboxy groups of the diglycolic acid is esterified.

10. In a process for breaking petroleum oil emulsions of the water-in-oil type, subjecting said emulsion to the action of a water-insoluble composition comprising a substantially linear, hydrocarbon solvent soluble, alkyl phenol-formaldehyde condensation product having about 4–15 phenolic nuclei, wherein the alkyl phenol is at least 75% mono-alkyl phenol and the alkyl group has 5–15 carbons, said condensation product being substituted on the phenolic nuclei by polyoxyalkylene radicals wherein the alkylene groups contain 2–3 carbons, at least one of the polyoxyalkylene groups per molecule of condensation product being sulfated with sulfamic acid to form the ammonium salt of the sulfated polyoxyalkylated phenol-formaldehyde condensation product, the weight ratio of oxyalkylene groups to said condensation product being in the range of 1:2 to 15:1, respectively, at least one hydroxyl group of the polyoxyalkylene radicals per molecule of condensation product being esterified with maleic acid and wherein substantially only one of the two carboxy groups of the maleic acid is esterified.

References Cited by the Examiner

UNITED STATES PATENTS

| | | | |
|---|---|---|---|
| 2,454,542 | 11/48 | Bock et al. | 260—53 |
| 2,454,544 | 11/48 | Bock et al. | 260—53 |
| 2,541,994 | 2/51 | De Groote et al. | 252—337 |
| 2,854,428 | 9/58 | De Groote et al. | 260—832 |
| 3,108,087 | 10/63 | Kirkpatrick et al. | 260—49 |

JULIUS GREENWALD, *Primary Examiner.*